(12) United States Patent
Bandi et al.

(10) Patent No.: US 10,528,103 B2
(45) Date of Patent: Jan. 7, 2020

(54) DIE INTERCONNECT SIGNAL MANAGEMENT DEVICES AND METHODS

(71) Applicant: Intel Corporation, Santa Clara, CA (US)

(72) Inventors: Chenchu Punnarao Bandi, Bayan Lepas (MY); Amit Kumar Srivastava, Penang (MY)

(73) Assignee: Intel Corporation, Santa Clara, CA (US)

( * ) Notice: Subject to any disclaimer, the term of this patent is extended or adjusted under 35 U.S.C. 154(b) by 162 days.

(21) Appl. No.: 15/622,775

(22) Filed: Jun. 14, 2017

(65) Prior Publication Data

US 2018/0364774 A1 Dec. 20, 2018

(51) Int. Cl.
| | |
|---|---|
| *G06F 1/00* | (2006.01) |
| *G06F 1/26* | (2006.01) |
| *H04B 3/54* | (2006.01) |
| *G06F 1/06* | (2006.01) |

(52) U.S. Cl.
CPC ............... *G06F 1/26* (2013.01); *G06F 1/06* (2013.01); *H04B 3/542* (2013.01); *H04B 3/544* (2013.01)

(58) Field of Classification Search
CPC ..... H01L 2224/85; H01L 24/48; H01L 24/49; H01L 2225/06506; H01L 23/3114; H01L 2224/49175; H01L 2223/6611; G06F 9/3885; G06F 13/4221; G06F 13/4063; G06F 13/38; G06F 13/126; G06F 13/4204; G06F 15/7807; G06F 15/7864; H04B 1/708
See application file for complete search history.

(56) References Cited

U.S. PATENT DOCUMENTS

| | | | | |
|---|---|---|---|---|
| 6,426,560 | B1 * | 7/2002 | Kawamura | G11C 5/02 257/735 |
| 8,878,354 | B1 * | 11/2014 | Patel | H01L 25/0657 257/686 |
| 2009/0009337 | A1 * | 1/2009 | Rofougaran | G06K 7/10237 340/572.7 |
| 2015/0280709 | A1 * | 10/2015 | Cho | H03K 19/0005 326/30 |

* cited by examiner

*Primary Examiner* — Xuxing Chen
(74) *Attorney, Agent, or Firm* — Schwegman Lundberg & Woessner, P.A.

(57) ABSTRACT

A microelectronic assembly may include a first microelectronic device, a second microelectronic device, a first signal link, a second signal link, and a first power connection. The first microelectronic device may include a first interface powered at a first voltage. The second microelectronic device may include a second interface powered at a second voltage. The first signal link may supply a first signal at the first voltage from the first interface to the second interface. The second signal link may supply a second signal at the second voltage from the second interface to the first interface. The first power connection may supply a first reference signal at the first voltage from the first interface to the second interface.

21 Claims, 7 Drawing Sheets

DIE INTERCONNECT SIGNAL MANAGEMENT DEVICES AND METHODS

TECHNICAL FIELD

Embodiments described herein generally relate to connections between microelectronic devices.

BACKGROUND

Microelectronic devices may include chips or integrated circuit devices, which may include processors such as central processing units (CPUs) or graphics processing units (GPUs) among others, for example. In some microelectronic assemblies multiple chips may be used to manage different processes. For example, a microelectronic device may include a chip containing a CPU and another package containing inputs and outputs, such as a universal serial bus (USB) or serial advanced technology attachment (SATA) connection or parallel Interface (DDR), for example. Often times there is a need for separate chips to communicate with one another, requiring a parallel link on each chip that transmits information between the chips.

DETAILED DESCRIPTION

Figure 1:
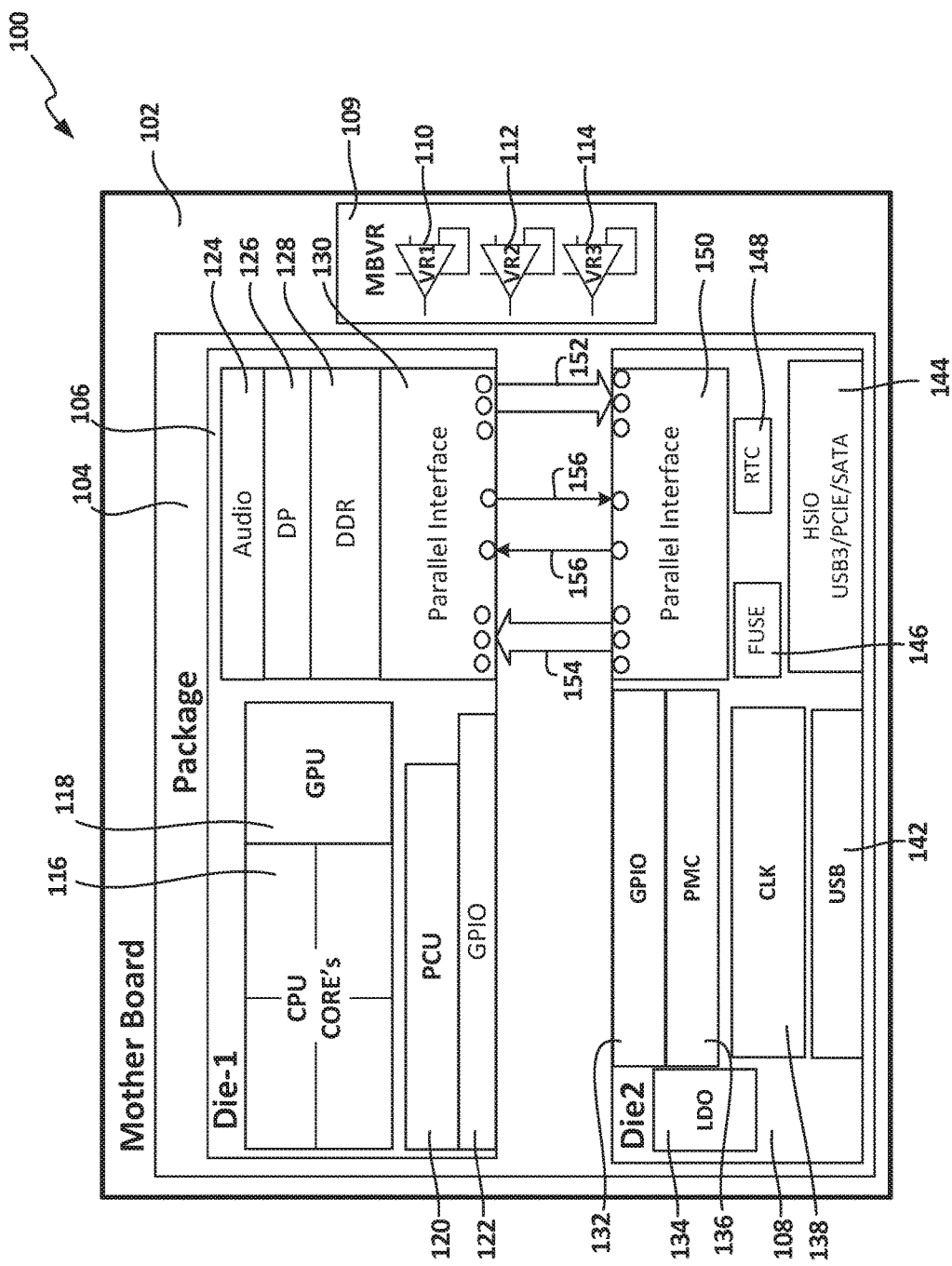
FIG. 1 illustrates a schematic view of a microelectronic assembly, in accordance with at least one example of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some microelectronic assemblies, integrated circuits communicate with one another to synchronize operations and to share data, in some examples. To accomplish this communication, the integrated circuits may include parallel interfaces that may serve as devices dedicated to chip to chip communication. In some cases, it may be desirable to power dies and therefore parallel interfaces of different dies at different voltages. For example, a first die may include components of a different chip architecture than components of a second die (for example the first component may be on lower process node architecture than the components of the second die architecture).

Because of the variances in architecture, it may be required to operate the dies at different voltages to operate them at similar speeds. In some prior art, to overcome operational differences in voltage between chips, parallel interfaces of separate chips may be powered by a common voltage regulator to simplify communication and receiver design and. However, this design may increase product cost by including a dedicated voltage regulator and may decrease efficiency by requiring one parallel interface to operate at a voltage higher than necessary. Therefore, it may be desired for parallel interfaces operating at different speeds to be powered by separate voltage regulators. However, this solution may complicate receiver design and signal processing, increasing cost and decreasing efficiency.

The present disclosure includes, among other things, parallel interfaces that may operate at different voltages (that is, they may be powered by separate voltage regulators) by providing a reference power signal from each die to the other. For example, a receiver of a receiving parallel interface may use a reference voltage supplied by the transmitting parallel interface. The receiver may then use the reference voltage sample data from the received data signal. This may balance the data swing about the center (reference) voltage, allowing for use of a simple receiver design while allowing the dies to operate at different voltages, saving time, saving bill of material (BOM) cost, and increasing operational efficiency.

In one example, a microelectronic assembly may include a first microelectronic device, a second microelectronic device, a first signal link, a second signal link, and a power connection. The first microelectronic device may include a first interface powered at a first voltage. The second microelectronic device may include a second interface powered at a second voltage. The first signal link may supply a first signal at the first voltage from the first interface to the second interface. The second signal link may supply a second signal at the second voltage from the second interface to the first interface. The power connection may supply a first reference signal at the first voltage from the first interface to the second interface. In some examples, the power connection may include a first power connection, and the microelectronic device may further include a second power connection to supply a second reference signal at the second voltage from the second interface to the first interface.

FIG. 1 illustrates a schematic view of microelectronic assembly 100 in accordance with at least one example of the present disclosure. Assembly 100 may include motherboard 102, package 104, first die (or first chip) 106, second die (or second chip) 108, and motherboard voltage regulator 109, which may include voltage regulator one (VR1) 110, voltage regulator two (VR2) 112, and voltage regulator three (VR3) 114. First die 106 may include CPU 116, GPU 118, power control unit (PCU) 120, general purpose input output (GPIO) 122, audio link 124, display port 126, double data rate port (DDR) 128, and first parallel interface 130. Second die 108 may include GPIO 132, low drop out regulator (LDO) 134, display port 126, double data rate port (DDR) 128, and first parallel interface 130, power management control Unit (PMC) 136, clock (isCLK) 138, universal serial bus (USB) 142, high speed input/output (HSIO) 144, fuse 146, real time clock generator (RTC) 148, and second parallel interface 150. Package 104 may also include first signal connection 152, second signal connection 154, and power traces 156.

Motherboard 102 may be a microelectronic device board, such as an integrated circuit board, including transistors and circuits of any of multiple forms known in the industry, providing conductive structures, physical support for components, and electrical contacts to distribute signals. In some examples, motherboard 102 may connect to a power supply and non-volatile memory in a case or enclosure. Similarly, package 104 may be a microelectronic device board, such as an integrated circuit board, including transistors and circuits of any of multiple forms known in the industry, providing conductive structures, physical support for components, and electrical contacts to distribute signals. Package 104 may include first die 106 and second die 108, which may each be supported by package 104.

Motherboard 102 may support and may be electrically connected to motherboard voltage regulator 109, which includes VR1 110, VR2 112, and VR3 114. Each individual voltage regulator may be configured to connect to and supply a voltage to one or more components of package 104, as discussed in further detail below. In some examples, motherboard voltage regulator 109 which may include VR1 110. VR2 112, and VR3 114 may be placed on the package 104 for to save space. In other examples, voltage regulators VR1 110, VR2 112, and VR3 114 which are part of motherboard voltage regulator 109, may be directly part of corresponding first die 106 or second die 108 based on usage.

First die 106 may include CPU 116, which may be a single or multi-core processor configured to perform operations on data. First die 118 may also include a dedicated GPU, GPU 118, which may also include one or more cores, where GPU may be configured to perform operations on graphics data, in some examples. PCU 120 may be a chip dedicated to managing power based on operating conditions of first die 106, such as temperature, for example.

GPIO 122 may be a generic pin on integrated circuit connector that is supported by and electrically coupled to first die 106. Audio link 124 may be audio inputs and outputs configured to transmit audio signals. Similarly, display port 126 may be display inputs and outputs (such as video graphics array [VGA] or high definition multimedia interface [HDMI]) configured to transmit display signals.

DDR 128 may be one or more ports configured to transmit data at a double rate. For example, DDR 128 may be configured to couple to volatile memory such as random-access memory (RAM).

Second die 108 may include similar components to first die 106, such as GPIO 132. Second die 108 may also include components not found on first die 106, such as LDO 134, which may be configured to be coupled to second die 108 and regulate output voltage. PMC 136 may be coupled to die 108 and may be an interface configured to manage die power, for example.

Second die may also support and connect to high speed connectors such as USB 142 and HSIO 144, where HSIO 144 may include USB 3, for example. Second die 108 may include real time clock generator (RTC) 148, which may be a chip configured to manage a real time clock.

First parallel interface 130 may be electrically connected to first die 106 and second parallel interface 150 may be electrically connected to second die 108. First signal connection 152 and second signal connection 154 may be traces or conductors in package 104, where first signal connection 152 is configured to transmit a first communication signal from first parallel interface 130 to second parallel interface 150. Similarly, second signal connection 154 may be configured to transmit a second communication signal from second parallel interface 150 to first parallel interface 130. Power traces 156 may also be traces or conductors connecting first parallel interface 130 and second parallel interface 150, and may each be configured to transfer a reference signal, or a reference voltage, between first parallel interface 130 and second parallel interface 150.

The components of first die 106 and second die 108 may be connected to different voltage regulators. For example, CPU 116 may have a dedicated voltage regulator, as may GPU 118. In some examples, PCU 120. PMC 136, and USB 142 may receive power from VR3 114. Also, audio link 124, display port 126, DDR 128, and first parallel interface 130 may be connected to VR1 110, clock 138. HSIO 144, and second parallel interface 150 may be connected to VR2 112. These components may operate at different voltages, because, for example, DDR and parallel interface 130 may use a lower process node architecture than an architecture of parallel interface 150 and HSIO 144.

As discussed below in further detail, in operation of some examples, a receiver of second parallel interface 150 may receive a reference voltage from first parallel interface 130 via power traces 156. Similarly, a receiver of first parallel interface 130 may receive a reference voltage from second parallel interface 150 via power traces 156. The receiver of first parallel interface 130 may use the reference voltage from second parallel interface 150 to sample data provided from second parallel interface 150 to first parallel interface 130 via signal connection 154. Also, the receiver of second parallel interface 150 may use the reference voltage from first parallel interface 130 to sample data provided from first parallel interface 130 to second parallel interface 150 via signal connection 152. In some examples, power traces 156 in each direction may be interleaved, for example, with corresponding signal traces 152 and 154.

The reference voltage may be split prior to delivering the reference voltage to the receiver. Because each receiver may compare a data signal from the same source as the reference signal, the data swing may be symmetrical about the center voltage (for example ±0.5 volts for a 0 to 1 volt data swing). By providing an equal data swing to the receiver, efficient and economical receivers may be used.

Figure 2:
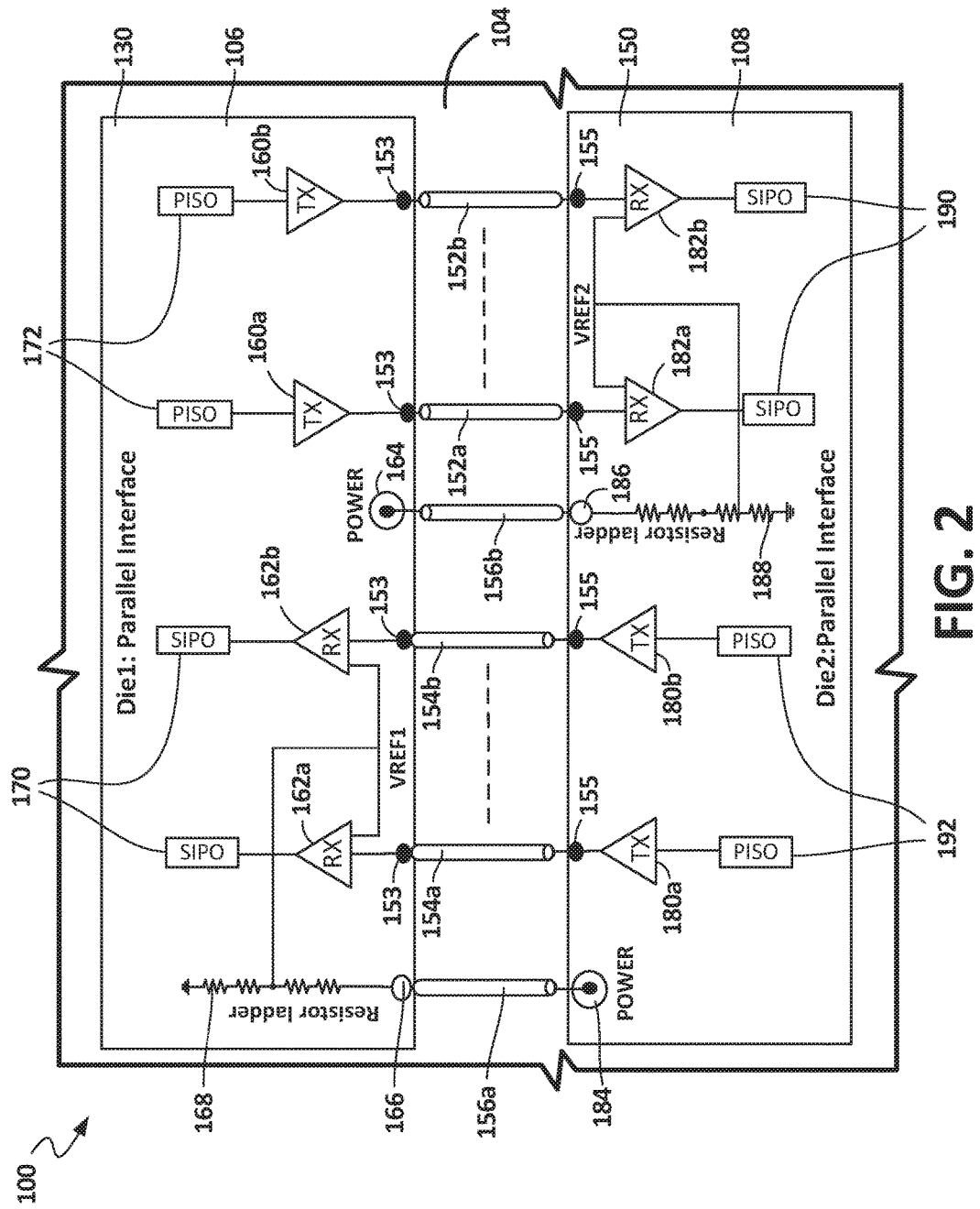
FIG. 2 illustrates a schematic view of circuits of a microelectronic assembly, in accordance with at least one example of the present disclosure.

FIG. 2 illustrates a schematic view of circuits of microelectronic assembly 100, in accordance with at least one example of the present disclosure. Microelectronic assembly 100 may include package 104, which may include first die 106, and second die 108. First die 106 may include first parallel interface 130, second die 108 may include second parallel interface 150. Package 104 may also include first signal traces 152a and 152b, second signal traces 154a and 154b, and power traces 156a and 156b. Parallel interface 130 may include transmitters 160a and 160b, receivers 162a and 162b, reference signal connection 164, reference signal connection 166, resistor ladder 168, serial input parallel output connections (SIPO) shift registers 170, and parallel input serial output connections (PISO) shift registers 172. Similarly, parallel interface 150 may include transmitters 180a and 180b, receivers 182a and 182b, reference signal connection 184, reference signal connection 186, resistor ladder 188, serial input parallel output connections (SIPO) shift registers 190, and parallel input serial output connections (PISO) shift registers 192.

The components of microelectronic assembly 100 illustrated in FIG. 2 may be consistent with the components of microelectronic assembly 100 illustrated in FIG. 1; however, FIG. 2 shows additional details of microelectronic assembly 100.

First signal traces 152a and 152b, second signal traces 154a and 154b, power traces 156a and 156b may be conductors or traces embedded in package 104 and may connect first die 106 to second die 108. Each trace may be connected to first die at one of connections 153 and to second die at one of connections 155. First die 106 may also include reference signal connection 164 and reference signal connection 166, which may be conductive terminations for connection of power traces 156a and 156b onto first die 106. Second die 108 may include reference signal connection 184 and reference signal connection 186, which may be conductive terminations for connection of power traces 156a and 156b onto second die 108.

Resistor ladders 168 and 188 may be fixed resistor ladders, each configured to manipulate a reference signal. Resistor ladder 168 may be disposed on first parallel interface 130 and connected to power trace 156a. Resistor ladder 188 may be disposed on second parallel interface 150 and connected to power trace 156b. Resistor ladders 168 and 188 may divide a reference signal in ½, ⅓, ¼, and the like.

Transmitters 160a and 160b and 180a and 180b may be single-ended transmitters, configured to supply a high and low logic signal to receivers 162a and 162b. In some examples, transmitters 160a and 160b may be a CMOS type of IO buffer. Transmitter 160a may be connected to one of PISO 172 and termination 153 (and therefore to receiver 182a of parallel interface 150 via trace 152a. Transmitter 160b may be connected to one of PISO 172 and to receiver 182b via trace 152b. Transmitter 180a may be connected to one of PISO 192 and termination 155 and therefore to trace 154a, termination 153, and receiver 162a. Transmitter 180b may be connected to one of PISO 192 and receiver 162b via trace 154b and terminations 153 and 155.

Receivers 162a and 162b and 182a and 182b may be differential receivers, where each receiver may be configured to receive a data signal from one transmitter and a reference signal from another source. Receivers 162a and 162b and 182a and 182b may be of many types such as strong arm latch, simple CMOS based comparators, and the like. In some examples, receiver 162a may be connected to transmitter 180a (as described above), to resistor ladder 168, and to one of SIPO 170. Receiver 162b may be connected to transmitter 180b, to resistor ladder 168, and to one of SIPO 170. Receiver 182a may be connected to transmitter 186a (as described above), to resistor ladder 188, and to one of SIPO 190. Receiver 182b may be connected to transmitter 160b, to resistor ladder 188, and to one of SIPO 190.

SIPO shift registers 170, PISO shift registers 172, SIPO shift registers 190, and PISO shift registers 192 may be shift registers (or a cascade of latches or flip flops) configured to store and transfer data between serial and parallel connections, for example. In some examples, parallel interface 130 may be powered by VR110 of FIG. 1 and parallel interface 150 may be powered by VR2 112 of FIG. 1.

In operation of some examples, data signals may be provided to PISO shift registers 172 from components connected to parallel interface 130, such as DDR 128, for example, for transmission to components of second die 108, such as HSIO 144 for example. Data signals from PISO shift registers 172 may be serially sent (separately) to transmitters 160a and 160b, where each transmitter may then send a data signal to receivers 182a and 182b, respectively via traces 152a and 152b, respectively.

Parallel interface 130 may also send a reference signal (a reference voltage) from reference signal connection 164 of parallel interface 130 to reference signal connection 186 of parallel interface 150. The reference signal may be received by resistor ladder 188 of parallel interface 150, which may divide the voltage of the reference signal before supplying the divided voltage reference signal to receivers 182a and 182b.

Accordingly, each of receivers 182a and 182b (which may be differential receivers, as discussed above) may receive a data signal and a reference signal. For example, receiver 182a receives a data signal from transmitter 160a and a reference signal from reference signal connection 164 of parallel interface 130 (after it is divided by resistor ladder 188). Receiver 182a, being a differential receiver, may compare the data signal to the reference signal to detect either a high or a low logic signal (a one or a zero condition). Once the condition has been determined to be either a high or a low logic signal, receiver 182a may then send a corresponding high or low signal to SIPO 190. Receiver 182b may perform the same operation using a data signal from transmitter 160b and the reference signal. In this way, first die 106 may deliver data signals to second die 108 at a first voltage supplied from VR1 110, while second die 108 operates at a second voltage supplied by VR2 112, for example.

Similarly, second die 108 may deliver data signals to first die 106 at the second voltage supplied from VR2 112, while first die 106 operates at the first voltage. For example, transmitters 180a and 180b may send respective data signals to receivers 162a and 162b, where each of receivers 162a and 162b also receiver reference signals from resistor ladder 168 (provided via reference signal connection 184). Once the condition has been determined by receivers 162a and 162b to be either a high or a low logic signal, receivers 162a and 162b may then respectively send corresponding high or low signals to SIPO shift registers 170.

Because, for example, receiver 182a is comparing a data signal from the same source as the reference signal, both signals begin at a voltage of the same voltage regulator, for example VR1 110. This may allow the data swing to be symmetrical about the center voltage. For example, if VR1 110 operates at 1.0 volts, and the resistor ladder 188 divides the voltage in half, the high logic condition may be 1 volt minus 0.5 volts, or +0.5 volts and the low logic condition may be 0.5 volts minus 1 volt or −0.5 volts, providing a 1 volt data swing, which is symmetrical about 0 volts.

By providing an equal data swing to the receiver, efficient and economical receivers may be used. Use of more efficient receivers and allowing dies to operate at voltages optimized for their respective chip architecture in targeted processes, which may improve efficiency and increase battery life of the overall system, in some examples. This system may also allow for voltage regulators to be more commonly shared within a die and/or package, helping to reduce a quantity of voltage regulators and lowering bill of material cost.

Further, because parallel interfaces 130 and 150 may operate at independent voltages, die skewing and jitter may be avoided or reduced. Also, because voltages are independently supplied to dies, this system and method may operate with a variety of chip architectures, potentially improving backward compatibility. Also, this solution may avoid complex supply and process binning for companion dies and may improve the signal return path while having a robust Vcc (source) and Vss (ground) planes.

Though microelectronic assembly 100 of FIG. 2 shows one reference signal trace per two data signal traces, the number of power traces may be larger or smaller. For example, there may be 1, 3, 4, 5, 6, 7, 8, 10, 20, and the like data signal traces per one reference signal trace. The number may be optimized for communication effectiveness and manufacturing efficiencies, in some examples.

Though resistor ladders 168 and 188 are shown as stacked resistors, other devices, such as CMOS based devices, may be used to generate reference voltages.

Figure 3:
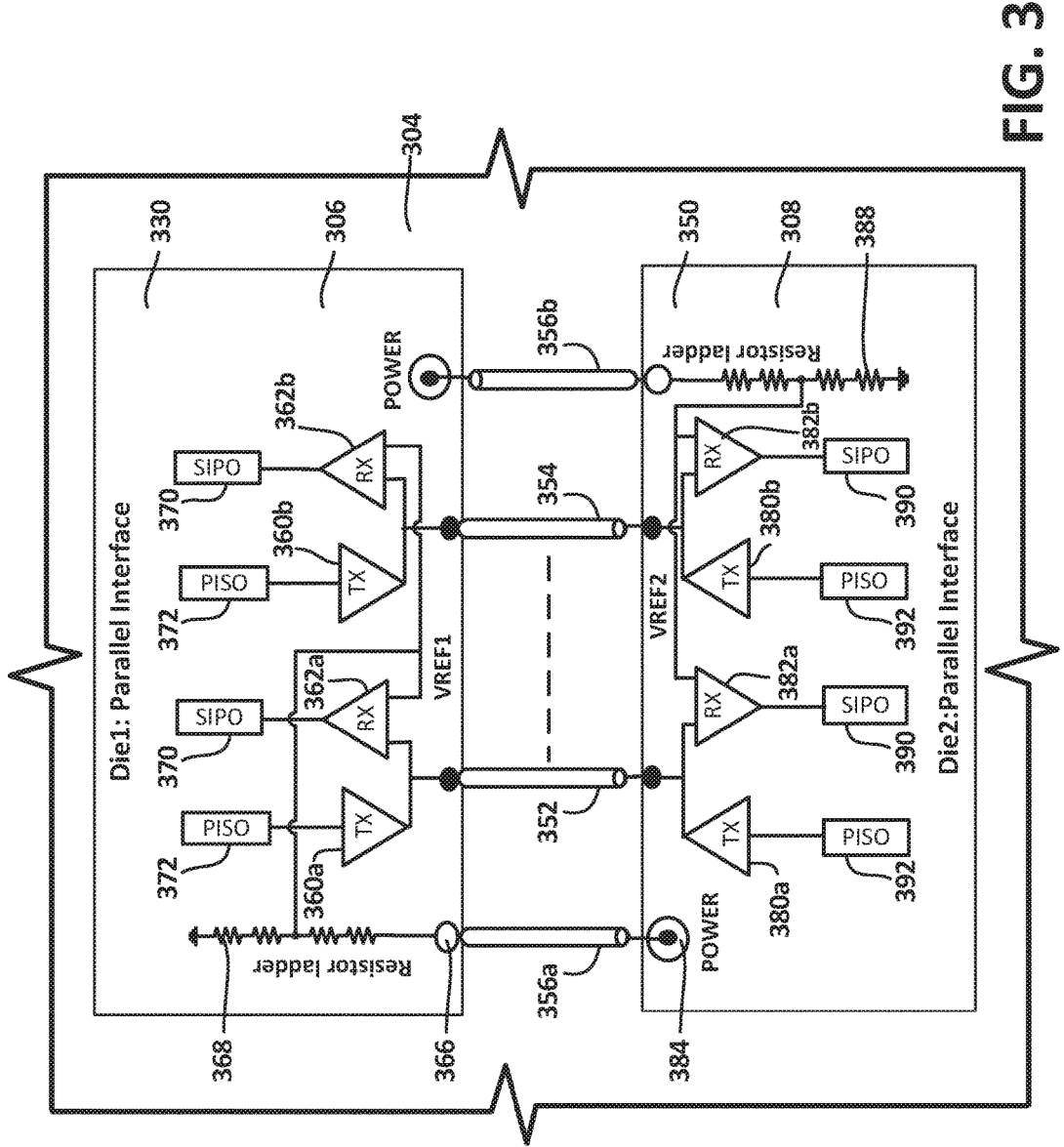
FIG. 3 illustrates a schematic view of a package of a microelectronic assembly, in accordance with at least one example of the present disclosure.

FIG. 3 illustrates a schematic view of package 304, which may be a portion of a microelectronic assembly, such as microelectronic assembly 100 of FIG. 1. Package 304 may include first die 306, and second die 308. First die 306 may include first parallel interface 330, second die 308 may include second parallel interface 350. Package 304 may also include first signal trace 352, second signal trace 354, and power traces 356a and 356b. Parallel interface 330 may include transmitters 360a and 360b, receivers 362a and 362b, reference signal connection 364, reference signal connection 366, resistor ladder 368, serial input parallel output connections (SIPO) shift registers 370, and parallel input serial output connections (PISO) shift registers 372. Similarly, parallel interface 350 may include transmitters 380a and 380b, receivers 382a and 382b, reference signal connection 384, reference signal connection 386, resistor ladder 388, serial input parallel output connections (SIPO) shift registers 390, and parallel input serial output connections (PISO) shift registers 392.

Package 304 may be similar to package 104, except that package 304 includes signal traces 352 and 354, which may be bidirectional interfaces. That is, each of signal traces 352 and 354 connect to a pair of receivers and transmitters and are each used for independent and serial receipt and transmission of signals. For example, transmitter 360a and receiver 362a of first parallel interface 330 each connect to signal trace 352, which further connects to transmitter 380a and receiver 382a of second parallel interface 350. Similarly, transmitter 360b and receiver 362b of first parallel interface 330 each connect to signal trace 354, which further connects to transmitter 380b and receiver 382b of second parallel interface 350. In these examples, receivers and transmitters may share a signal trace, which, in addition to the benefits discussed with reference to FIGS. 1 and 2 above, may reduce bill of material cost, for example.

Figure 4B:
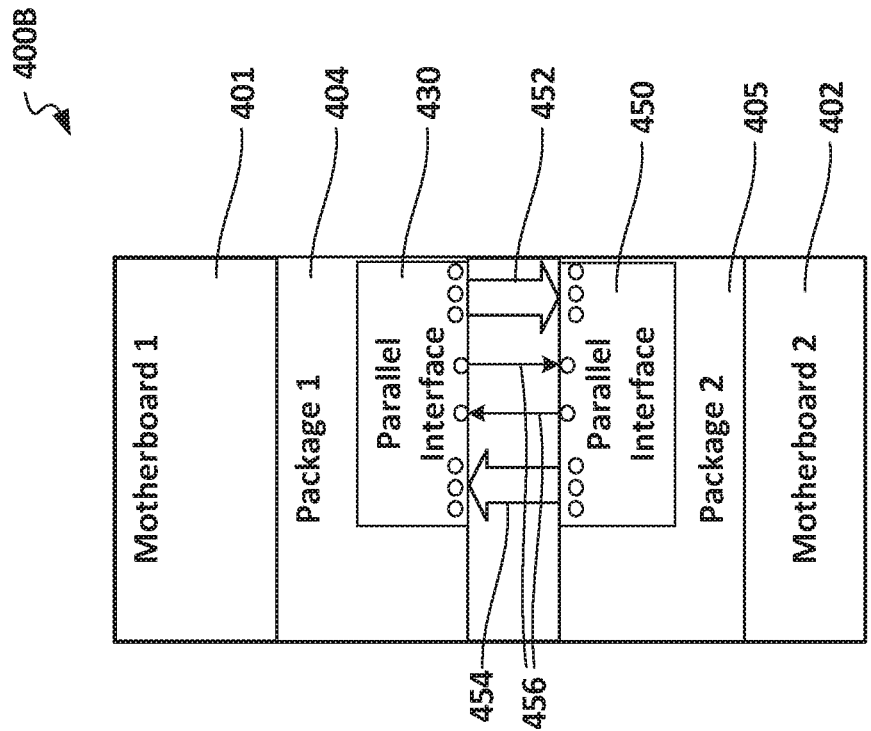
FIG. 4B illustrates a schematic view of a microelectronic assembly, in accordance with at least one example of the present disclosure.
Figure 4A:
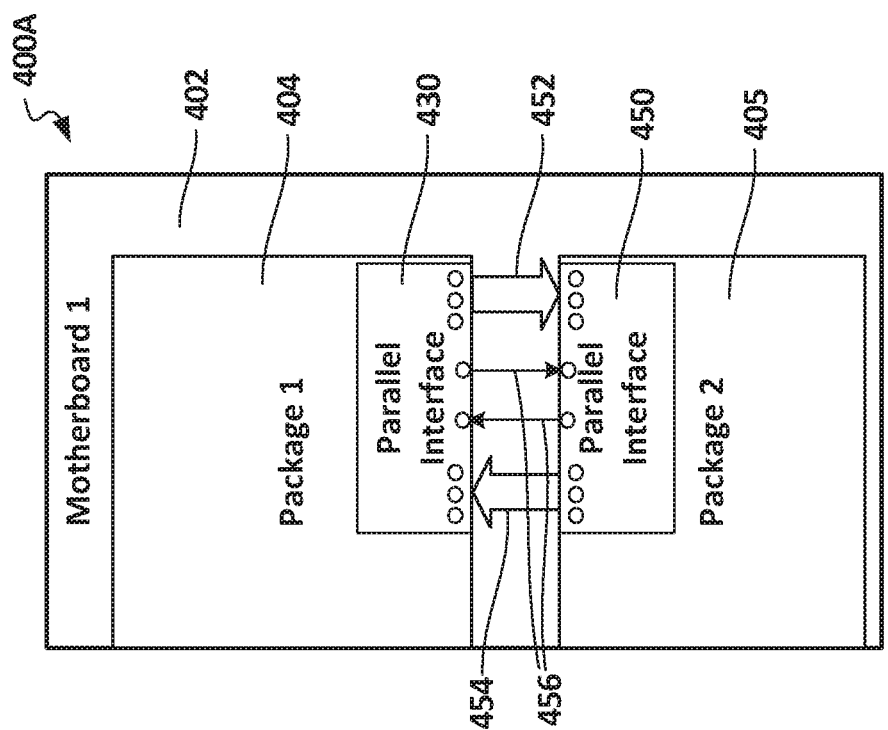
FIG. 4A illustrates a schematic view of a microelectronic assembly, in accordance with at least one example of the present disclosure.

FIG. 4A illustrates a schematic view of microelectronic assembly 400A, in accordance with at least one example of the present disclosure. Microelectronic assembly 400A may include motherboard 402. Motherboard 402 may include first package 404 and second package 405. First package 404 may include parallel interface 430 and second package 405 may include second parallel interface 450. Motherboard 402 may also include data signal traces 452 and 454 and reference signal traces 456.

Microelectronic assembly 400A may be similar to microelectronic assembly 100 described above with respect to FIGS. 1 and 2, except that in microelectronic assembly 400A, first parallel interface 430 is included in first package 404 and second parallel interface 450 may be integrated in second package 405, such that data signal traces 452 and 454 and reference signal traces 456 (which may be on motherboard 402) connect two separate packages. This example of microelectronic assembly may allow for packages having parallel interfaces operating at different voltages to effectively and efficiently communicate.

FIG. 4B illustrates a schematic view of microelectronic assembly 400B, in accordance with at least one example of the present disclosure. Microelectronic assembly 400B may include motherboard 401 and motherboard 402. Motherboard 401 may include first package 404 and motherboard 402 may include second package 405. First package 404 may include parallel interface 430 and second package 405 may include second parallel interface 3450. Data signal traces 452 and 454 and reference signal traces 456 may be printed on another board supporting both motherboard 401 and motherboard 402 or may be separate conductors there between.

Microelectronic assembly 400B may be similar to microelectronic assembly 400A described above with respect to FIG. 4A, except that in microelectronic assembly 400B, first parallel interface 430 may be integrated into first motherboard 401 and second parallel interface may be integrated into second motherboard 450, such that data signal traces 452 and 454 and reference signal traces 456 connect two separate packages on two separate motherboards. This embodiment may allow for motherboards having parallel interfaces operating at different voltages to effectively and efficiently communicate.

Figure 5A:
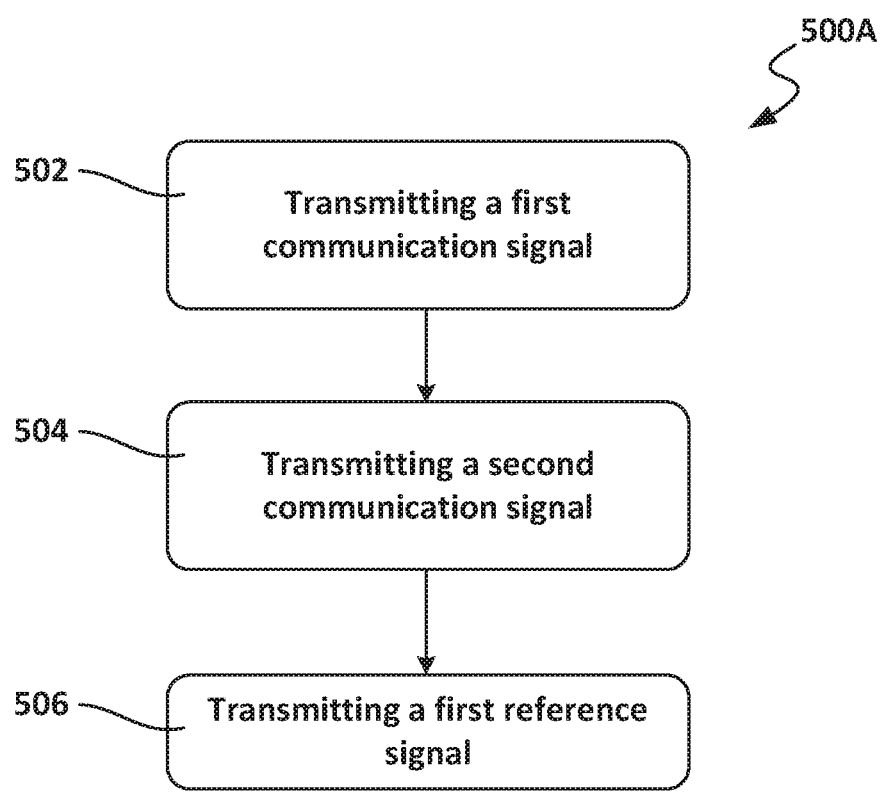
FIG. 5A illustrates a flow chart of a method, in accordance with at least one example of the present disclosure.

FIG. 5A illustrates a flow chart of an example method 500A, a method of communicating between chips, in accordance with at least one example of the present disclosure. The operations of method 500A are illustrated in a particular order for convenience and clarity. Many of the discussed operations may be performed in a different sequence or in parallel without materially impacting other operations. Method 500A, as discussed, includes operations performed by multiple different actors, devices, and/or systems. It is understood that subsets of the operations discussed in method 500A attributable to a single actor, device, or system could be considered a separate standalone process or method. Methods 500A and 500B may be examples of operations or procedures performed by microelectronic assemblies, such as microelectronic assembly 100 of FIGS. 1 and 2.

Method 500A may begin at operation 402, where a first communication signal, such as a data signal, may be transmitted, for example from transmitter 160a to receiver 182a. At step 404 a second communication signal may be transmitted, for example from transmitter 180a to receiver 162a. At step 406, a first reference signal may be transmitted, for example, from parallel interface 130 to a voltage divider (such as voltage divider 188) or parallel interface 150.

Figure 5B:
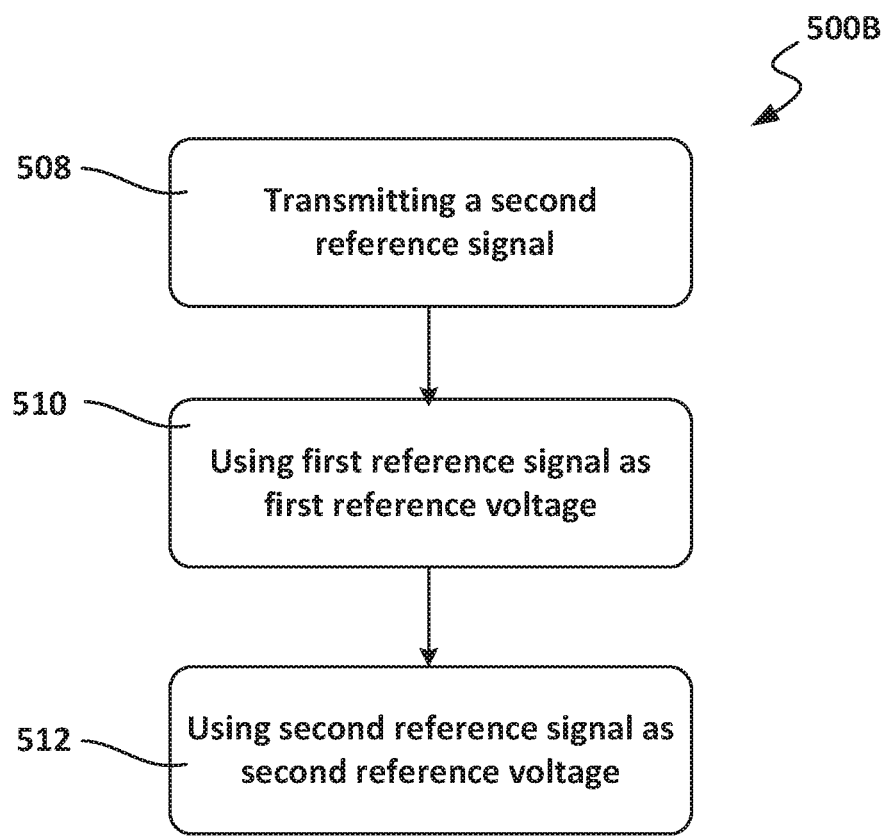
FIG. 5B illustrates a flow chart of a method, in accordance with at least one example of the present disclosure.

FIG. 5B illustrates a flow chart of another example method 500B in accordance with at least one example of the present disclosure. The operations or operations of method 500B are illustrated in a particular order for convenience and clarity. Many of the discussed operations may be performed in a different sequence or in parallel without materially impacting other operations. Method 500B, as discussed, includes operations performed by multiple different actors, devices, and/or systems. It is understood that subsets of the operations discussed in method 500B attributable to a single actor, device, or system could be considered a separate standalone process or method.

In operation of some example, method 500A may be continued from method 500B. For example, method 500B may continue from method 500A at operation 508, where a second reference signal may be sent, for example from parallel interface 150 to a voltage divider (such as voltage divider 168) or parallel interface 130. Then, at step 510, receiver 182a may use the first reference signal as a first reference voltage. Similarly, at step 512, receiver 162a may use the second reference signal as a second reference voltage.

Figure 6:
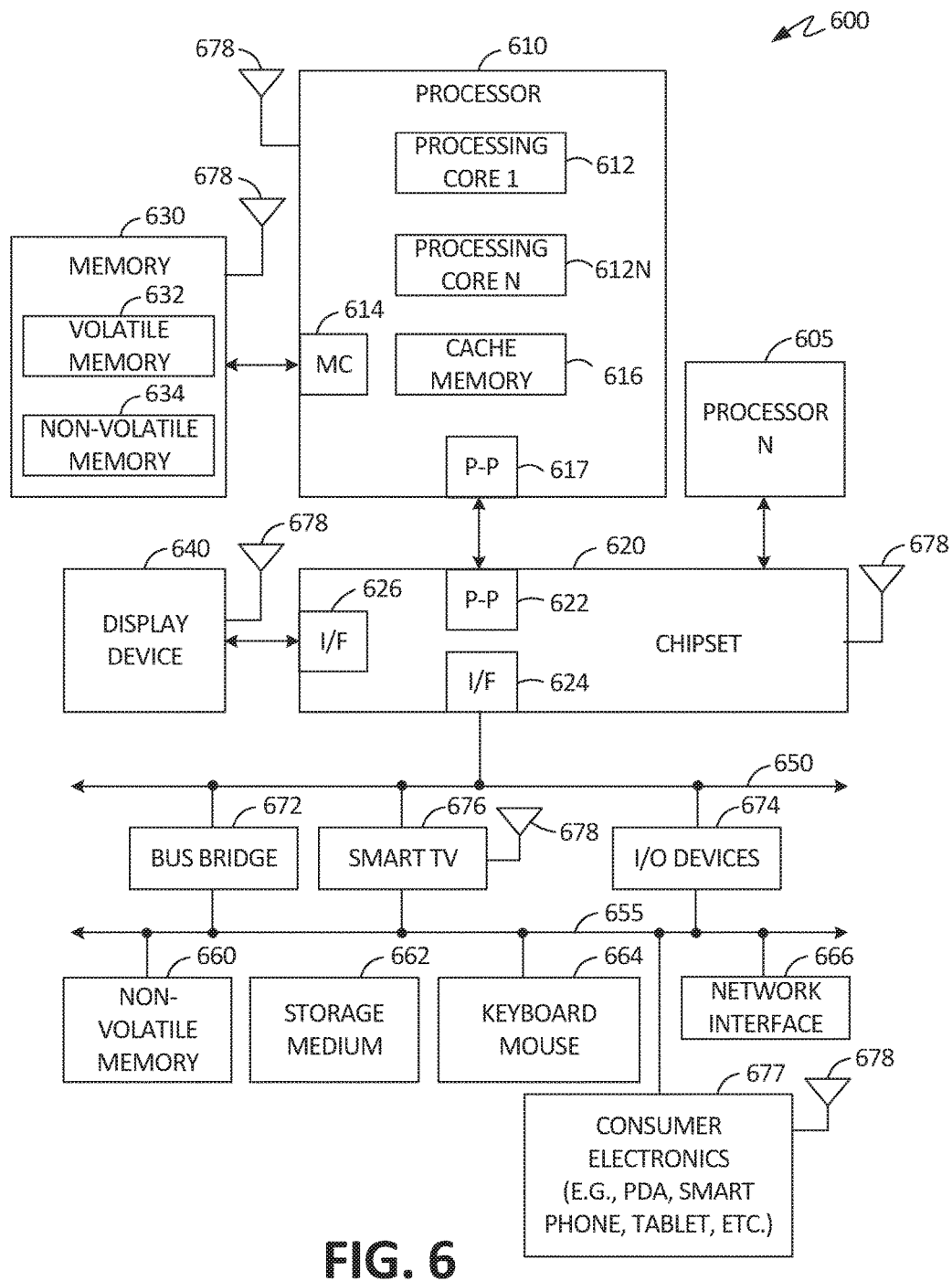
FIG. 6 illustrates a system level diagram, in accordance with at least one example of the present disclosure.

FIG. 6 illustrates a system level diagram, according to one example of the disclosure. For instance, FIG. 6 depicts an example of an electronic device (e.g., system) examples and methods described in embodiments above, such as microelectronic assembly 100, package 104, and dies 106 and 108, and associated methods. For example, processor 610 may be CPU 116 of FIG. 1, such that processor 610 may be on a die with a parallel interface in communication with other components, such as I/O devices 674, for example, that can be connected to a second parallel interface, where the first and second parallel interfaces are connected by first and second signal connections and power connections.

FIG. 6 is also included to show an example of a higher level device application for the present disclosure. In one embodiment, system 600 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 600 is a system on a chip (SOC) system.

In one embodiment, processor 610 has one or more processing cores 612 and 612N, where 612N represents the Nth processor core inside processor 610 where N is a positive integer. In one embodiment, system 600 includes multiple processors including 610 and 605, where processor 605 has logic similar or identical to the logic of processor 610. In some embodiments, processing core 612 includes, but is not limited to, pre-fetch logic to fetch instructions, decode logic to decode the instructions, execution logic to execute instructions and the like. In some embodiments, processor 610 has a cache memory 616 to cache instructions and/or data for system 600. Cache memory 616 may be organized into a hierarchal structure including one or more levels of cache memory.

In some embodiments, processor 610 includes a memory controller 614, which is operable to perform functions that enable the processor 610 to access and communicate with memory 630 that includes a volatile memory 632 and/or a non-volatile memory 634. In some embodiments, processor 610 is coupled with memory 630 and chipset 620. Processor 610 may also be coupled to a wireless antenna 678 to communicate with any device configured to transmit and/or receive wireless signals. In one embodiment, the wireless antenna interface 678 operates in accordance with, but is not limited to, the IEEE 802.11 standard and its related family, Home Plug AV (HPAV). Ultra Wide Band (UWB). Bluetooth, WiMax, or any form of wireless communication protocol.

In some embodiments, volatile memory 632 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 634 includes, but is not limited to, flash memory, phase change memory (PCM), read-only memory (ROM), electrically erasable programmable read-only memory (EEPROM), or any other type of non-volatile memory device.

Memory 630 stores information and instructions to be executed by processor 610. In one embodiment, memory 630 may also store temporary variables or other intermediate information while processor 610 is executing instructions. In the illustrated embodiment, chipset 620 connects with processor 610 via Point-to-Point (PtP or P-P) interfaces 617 and 622. Chipset 620 enables processor 610 to connect to other elements in system 600. In some embodiments of the disclosure, interfaces 617 and 622 operate in accordance with a PtP communication protocol such as the Intel® QuickPath Interconnect (QPI) or the like. In other embodiments, a different interconnect may be used.

In some embodiments, chipset 620 is operable to communicate with processor 610, 605N, display device 640, and other devices 672, 676, 674, 660, 662, 664, 666, 677, etc. Chipset 620 may also be coupled to a wireless antenna 678 to communicate with any device configured to transmit and/or receive wireless signals.

Chipset 620 connects to display device 640 via interface 626. Display 640 may be, for example, a liquid crystal display (LCD), a plasma display, cathode ray tube (CRT) display, or any other form of visual display device. In some embodiments of the disclosure, processor 610 and chipset 620 are merged into a single SOC. In addition, chipset 620 connects to one or more buses 650 and 655 that interconnect various elements 674, 660, 662, 664, and 666. Buses 650 and 655 may be interconnected together via a bus bridge 672. In one embodiment, chipset 620 couples with a non-volatile memory 660, a mass storage device(s) 662, a keyboard/mouse 664, and a network interface 666 via interface 624 and/or 604, smart TV 676, consumer electronics 677, etc.

In one embodiment, mass storage device 662 includes, but is not limited to, a solid state drive, a hard disk drive, a universal serial bus flash memory drive, or any other form of computer data storage medium. In one embodiment, network interface 666 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth. WiMax, or any form of wireless communication protocol.

While the modules shown in FIG. 6 are depicted as separate blocks within the system 600, the functions performed by some of these blocks may be integrated within a single semiconductor circuit or may be implemented using two or more separate integrated circuits. For example, although cache memory 616 is depicted as a separate block within processor 610, cache memory 616 (or selected aspects of 616) may be incorporated into processor core 612.

FURTHER NOTES AND EXAMPLES

To better illustrate the methods and apparatuses described herein, a non-limiting set of example embodiments are set forth below as numerically identified examples:

Example 1 is a microelectronic assembly comprising: a first microelectronic device comprising a first interface powered at a first voltage; a second microelectronic device comprising second interface powered at a second voltage; a first signal link to supply a first signal at the first voltage from the first interface to the second interface; a second signal link to supply a second signal at the second voltage from the second interface to the first interface; and a power connection to supply a first reference signal at the first voltage from the first interface to the second interface.

In Example 2, the subject matter of Example 1 optionally includes wherein the power connection comprises a first power connection, and wherein the microelectronic device further comprises a second power connection to supply a second reference signal at the second voltage from the second interface to the first interface.

In Example 3, the subject matter of Example 2 optionally includes wherein: the first interface further comprises a first receiver connected to the second signal link and the second power connection; and the second interface further comprises a second receiver connected to the first signal link and the first power connection.

In Example 4, the subject matter of Example 3 optionally includes wherein: the first interface further comprises a first voltage divider connected to the second power connection and the first receiver; and the second interface further comprises a second voltage divider connected to the first power connection and the second receiver.

In Example 5, the subject matter of any one or more of Examples 3-4 optionally include wherein: the first interface further comprises a first transmitter connected to the first signal link; and the second interface further comprises a second transmitter connected to the second signal link.

In Example 6, the subject matter of Example 5 optionally includes wherein: the first transmitter is to transmit the first signal at the first voltage to the second receiver; and the second transmitter is to transmit the second signal at the second voltage to the first receiver.

In Example 7, the subject matter of Example 6 optionally includes wherein: the second receiver is to use the first reference signal as a first reference voltage for the first signal; and the first receiver is to use the second reference signal as a second reference voltage for the second signal.

In Example 8, the subject matter of any one or more of Examples 1-7 optionally include wherein the first microelectronic device is a first die on a package and wherein the second microelectronic device is a second die on the package.

In Example 9, the subject matter of any one or more of Examples 1-8 optionally include wherein the first microelectronic device is a first die on a first package and wherein the second microelectronic device is a second die on a second package.

In Example 10, the subject matter of any one or more of Examples 1-9 optionally include wherein: the first interface further comprises a first receiver connected to the first signal link; the first interface further comprises a first transmitter connected to the first signal link; the second interface further comprises a second receiver connected to the first signal link and the power connection; and the second interface further comprises a second transmitter connected to the first signal link.

Example 11 is a microelectronic package comprising: a first die comprising a first microelectronic device that includes a first interface powered at a first voltage; a second die comprising a second microelectronic device that includes a second interface powered at a second voltage; a first plurality of signal links to supply a first plurality of signals at the first voltage from the first interface to the second interface; a second plurality of signal links to supply a second plurality of signals at the second voltage from the second interface to the first interface; a first power connection to supply a first reference signal at the first voltage from the first interface to the second interface; and a second power connection to supply a second reference signal at the second voltage from the second interface to the first interface.

In Example 12, the subject matter of Example 11 optionally includes the first interface further comprises a first plurality of receivers, each connected to one of the plurality of second signal links and the second power connection; and the second interface further comprises a second plurality of receivers, each connected to one of the plurality of first signal links and the first power connection.

In Example 13, the subject matter of Example 12 optionally includes wherein: each of the plurality of second receivers uses the first reference signal as a first reference voltage; and each of the plurality of first receivers uses the second reference signal as a second reference voltage.

In Example 14, the subject matter of any one or more of Examples 11-13 optionally include wherein the plurality of signal links is of a quantity of about 2 to about 10.

Example 15 is a method of communicating between a first microelectronic device operating at a first voltage and a second microelectronic device operating at second voltage, the method comprising: transmitting a first communication signal at a first voltage from a first transmitter of a first microelectronic device to a first receiver of a second microelectronic device via a first signal link; transmitting a second communication signal from a second transmitter of a second microelectronic device to a first receiver of a first microelectronic device via a second signal link; transmitting a first reference signal at the first voltage from the first microelectronic device to the second receiver; and using the first reference signal as a first reference voltage for the second receiver.

In Example 16, the subject matter of Example 15 optionally includes transmitting a second reference signal at the second voltage from the second microelectronic device to the first receiver.

In Example 17, the subject matter of Example 16 optionally includes using the second reference signal as a second reference voltage for the first receiver.

In Example 18, the subject matter of any one or more of Examples 16-17 optionally include wherein a first voltage divider divides the first voltage and wherein a second voltage divider divides the second voltage.

In Example 19, the subject matter of any one or more of Examples 16-18 optionally include wherein the first microelectronic device is a first die and the second microelectronic device is a second die.

In Example 20, the subject matter of Example 19 optionally includes wherein the first die operates at a first process speed and the second die operates at a second process speed that is different from the first process speed.

In Example 21, the subject matter of any one or more of Examples 19-20 optionally includes wherein the first die operates at a first process speed and the second die operates at a second process speed that is substantially equal to the first process speed.

In Example 22, the subject matter of any one or more of Examples 19-21 optionally includes wherein the first die and the second die are components of a common package.

Example 23 is a microelectronic assembly comprising: a first microelectronic device comprising a first interface powered at a first voltage; a second microelectronic device comprising second interface powered at a second voltage; a first means for supplying a first signal at the first voltage from the first interface to the second interface; a second means for supplying a second signal at the second voltage from the second interface to the first interface; and a first power connection to supply a first reference signal at the first voltage from the first interface to the second interface.

In Example 24, the subject matter of Example 23 optionally includes a second power connection to supply a second reference signal at the second voltage from the second interface to the first interface.

In Example 25, the subject matter of any one or more of Examples 23-24 optionally include wherein: the first interface further comprises a first receiver connected to the second means and the second power connection; and the second interface further comprises a second receiver connected to the first means and the first power connection.

In Example 26, the subject matter of Example 25 optionally includes wherein: the first interface further comprises a first voltage divider connected to the second power connection and the first receiver; and the second interface further comprises a second voltage divider connected to the first power connection and the second receiver.

In Example 27, the subject matter of any one or more of Examples 25-26 optionally include wherein: the first interface further comprises a first transmitter connected to the first means; and the second interface further comprises a second transmitter connected to the second means.

In Example 28, the subject matter of Example 27 optionally includes wherein: the first transmitter transmits the first signal at the first voltage to the second receiver; and the second transmitter transmits the second signal at the second voltage to the first receiver.

In Example 29, the subject matter of Example 28 optionally includes wherein: the second receiver uses the first reference signal as a first reference voltage for the first signal; and the first receiver uses the second reference signal as a second reference voltage for the second signal.

Example 30 is a microelectronic device of any of Examples claim 23, 24, 26, 27, 28 wherein the first microelectronic device is a first die on a package and wherein the second microelectronic device is a second die on the package.

Example 31 is a microelectronic device of Example 23, wherein the first microelectronic device is a first die on a first package and wherein the second microelectronic device is a second die on a second package.

Example 32 is a microelectronic device of Example 23, wherein: the first interface further comprises a first receiver connected to the first means; the first interface further comprises a first transmitter connected to the first means; the second interface further comprises a second receiver connected to the first means and the first power connection; and the second interface further comprises a second transmitter connected to the first means.

Example 33 is a microelectronic assembly comprising: a first microelectronic device comprising a first interface powered at a first voltage; a second microelectronic device comprising second interface powered at a second voltage; a first plurality of signal links to supply a first plurality of signals at the first voltage from the first interface to the second interface; a second plurality of signal links to supply a second plurality of signals at the second voltage from the second interface to the first interface; a first power connection to supply a first reference signal at the first voltage from the first interface to the second interface; and a second power connection to supply a second reference signal at the second voltage from the second interface to the first interface.

In Example 34, the subject matter of Example 33 optionally includes the first interface further comprises a first plurality of receivers, each connected to one of the plurality of second signal links and the second power connection; and the second interface further comprises a second plurality of receivers, each connected to one of the plurality of first signal links and the first power connection.

In Example 35, the subject matter of any one or more of Examples 33-34 optionally include wherein: each of the plurality of second receivers uses the first reference signal as a first reference voltage; and each of the plurality of first receivers uses the second reference signal as a second reference voltage.

In Example 36, the subject matter of any one or more of Examples 33-35 optionally include wherein the plurality of signal links is of a quantity of about 2 to about 10.

Example 37 is a microelectronic device package of any of Example 33 or 34, wherein the first microelectronic device is a first die on a package and wherein the second microelectronic device is a second die on the package.

In Example 38, the microelectronic devices, assemblies, or methods of any one of or any combination of Examples 1-37 is optionally configured such that all elements or options recited are available to use or select from.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The invention claimed is:

1. A microelectronic assembly comprising:
   a first microelectronic device comprising a first interface powered at a first voltage;
   a second microelectronic device comprising second interface powered at a second voltage;
   a first signal link to supply a first signal at the first voltage from the first interface to the second interface;
   a second signal link to supply a second signal at second voltage from the second interface to the first interface; and
   a power connection to supply a first reference signal at the first voltage from the first interface to the second interface.

2. The microelectronic assembly of claim 1, wherein the power connection comprises a first power connection, and wherein the second microelectronic device further comprises a second power connection to supply a second reference signal at the second voltage from the second interface to the first interface.

3. The microelectronic assembly of claim 2, wherein:
the first interface further comprises a first receiver connected to the second signal link and the second power connection; and
the second interface further comprises a second receiver connected to the first signal link and the first power connection.

4. The microelectronic assembly of claim 3, wherein:
the first interface further comprises a first voltage divider connected to the second power connection and the first receiver; and
the second interface further comprises a second voltage divider connected to the first power connection and the second receiver.

5. The microelectronic assembly of claim 3, wherein:
the first interface further comprises a first transmitter connected to the first signal link; and
the second interface further comprises a second transmitter connected to the second signal link.

6. The microelectronic assembly of claim 5, wherein:
the first transmitter is to transmit the first signal at the first voltage to the second receiver; and
the second transmitter is to transmit the second signal at the second voltage the first receiver.

7. The microelectronic assembly of claim 6, wherein:
the second receiver is to use the first reference signal as a first reference voltage for the first signal; and
the first receiver is to use the second reference signal as a second reference voltage for the second signal.

8. The microelectronic assembly of claim 1, wherein he first microelectronic device is a first die on a package and wherein the second microelectronic device is a second die on the package.

9. The microelectronic assembly of claim 1, wherein the first microelectronic device is a first die on a first package and wherein the second microelectronic device is a second die on a second package.

10. The microelectronic assembly of claim 1, wherein:
the first interface further comprises a first receiver connected to the first signal link;
the first interface further comprises a first transmitter connected to the first signal link;
the second interface further comprises a second receiver connected to the first signal link and the power connection; and
the second interface further comprises a second transmitter connected to the first signal link.

11. A microelectronic package comprising:
a first die comprising a first microelectronic device that includes a first interface powered at a first voltage;
a second die comprising a second microelectronic device that includes a second interface powered at a second voltage;
a first plurality of signal links to supply plurality of signals at the first voltage from the first interface to the second interface;
a second plurality of signal links to supply a second plurality of signals at the second voltage from the second interface to the first interface;
a first power connection to supply a first reference signal at he first voltage from the first interface to the second interface; and
a second power connection to supply a second reference signal at the second voltage from the second interface to the first interface.

12. The microelectronic package of claim 11, further comprising:
the first interface further comprises a first plurality of receivers, each connected to one of the plurality of second signal links and the second power connection; and
the second interface further comprises a second plurality of receivers, each connected to one of the plurality of first signal links and the first power connection.

13. The microelectronic package of claim 12, wherein:
each of the plurality of second receivers uses the first reference signal as a first reference voltage; and
each of the plurality of first receivers uses the second reference signal as a second reference voltage.

14. The microelectronic package of claim 11, wherein the plurality of signal links is of a quantity of 2 to 20.

15. A method of communicating between a first microelectronic device operating at a first voltage and a second microelectronic device operating at second voltage, the method comprising:
transmitting a first communication signal at a first voltage from a first transmitter of a first microelectronic device to a first receiver of a second microelectronic device via a first signal link;
transmitting a second communication signal from a second transmitter of a second microelectronic device to a first receiver of a first microelectronic device via a second signal link;
transmitting a first reference signal at the first voltage from the first microelectronic device to the second receiver; and
using the first reference signal as a first reference voltage for the second receiver.

16. The method of claim 15, further comprising:
transmitting a second reference signal at the second voltage from the second microelectronic device to the first receiver.

17. The method of claim 16, further comprising:
using the second reference signal as a second reference voltage for the first receiver.

18. The method of claim 16, wherein a first voltage divider divides the first voltage and wherein a second voltage divider divides the second voltage.

19. The method of claim 16, wherein the first microelectronic device is a first die and the second microelectronic device is a second die.

20. The method of claim 19, wherein the first die operates at a first process speed and the second die operates at a second process speed that is different from the first process speed.

21. The method of claim 19, wherein the first die operates at a first process speed and the second die operates at a second process speed that is substantially equal to the first process speed.

* * * * *